(No Model.)

W. MAYBACH.
MOTOR VEHICLE.

No. 494,641. Patented Apr. 4, 1893.

Witnesses:
E. Kayser.
Carl Roßbach

Inventor:
Wilhelm Maybach
by
Wm E. Poulter,
Attorney.

UNITED STATES PATENT OFFICE.

WILHELM MAYBACH, OF CANNSTADT, GERMANY.

MOTOR-VEHICLE.

SPECIFICATION forming part of Letters Patent No. 494,641, dated April 4, 1893.

Application filed October 15, 1892. Serial No. 449,033. (No model.)

*To all whom it may concern:*

Be it known that I, WILHELM MAYBACH, a subject of the King of Würtemberg, and a resident of Cannstadt, in the Kingdom of Würtemberg, Empire of Germany, have invented certain new and useful Improvements in Vehicles, of which the following is a full, clear, and exact specification.

My invention relates to a vehicle in which the vibrations of the motor are prevented from being transmitted to the carriage-body, and in which the axle of the driving gear and that of the driving-wheel are always kept at a constant distance from each other, independently of the shocks to which the carriage may be subjected.

Figure 1:
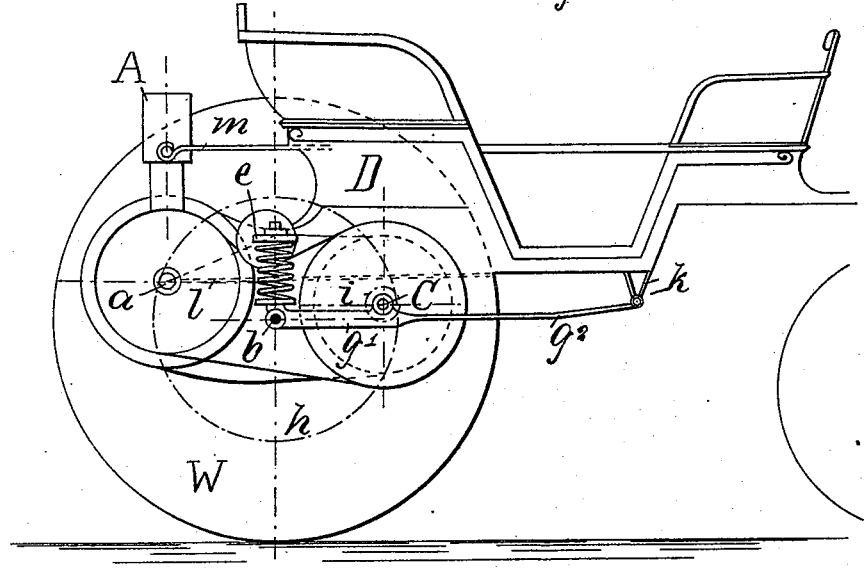
Figure 2:
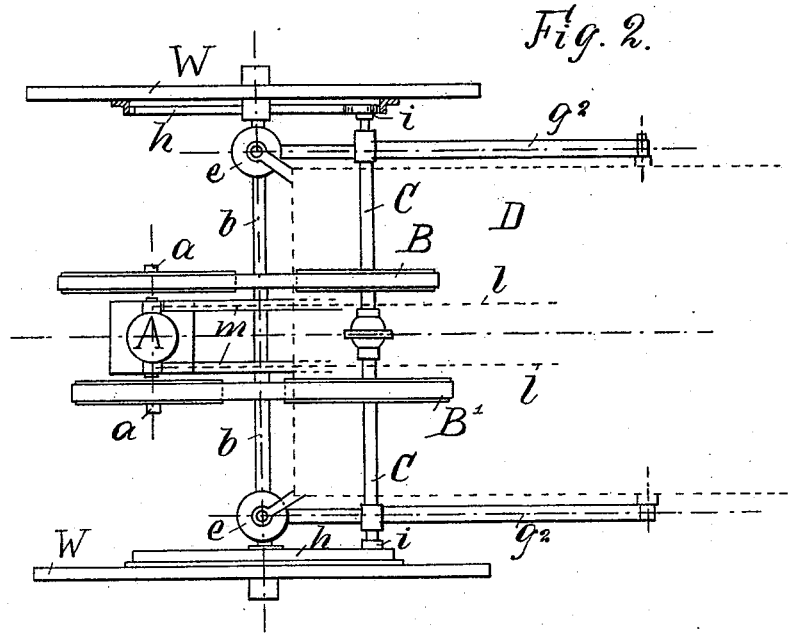

My invention will be more readily understood by reference to the accompanying drawings, in which:

Figure 1 is a side elevation showing the rear portion of a vehicle fitted with my improvements. Fig. 2 is a plan of the same.

Like letters indicate like parts in both views.

D is the carriage-body which is supported partly in usual manner by means of springs $e$, and partly by means of elastic arms $g^2$, which are nearly horizontal, and the ends whereof are secured to hangers $k$ fixed to the carriage-body D. The other end of the said arms $g^2$ is made broader in the vertical direction, as shown at $g'$, and is secured to the fixed (i. e. non-rotating) axle $b$ of the carriage-wheels. At the place where the breadth of the arms $g'$ $g^2$ decreases, I provide the bearings for the axle C of the driving-gear, which consists of two belt-pulleys B B', and of two toothed wheels $i$ engaging with the annular wheels $h$ secured to the rotatable carriage-wheels W. It will be understood that the arms $g'$ will be almost entirely rigid between the axles C and $b$.

$a$ is the main-shaft of the motor and rotates in bearings which are provided at the ends of elastic arms $l$ secured to the body D of the carriage. The upper part of the motor A is likswise held by means of horizontal elastic stays $m$, the latter being preferably rigidly secured to the body D, and to the motor A by means of a joint admitting a vertical movement.

The operation of the mechanism is as follows: When the motor A is started, the arms $g^2$ will be bent somewhat till the pressure between the flanks of the teeth of the wheels $i$ and $h$ is sufficient to set the carriage in motion. The arms $g'$, however, will not be bent, and in consequence thereof the axles $b$ and C will remain parallel to each other and the gearing of the wheels $i$ and $h$ will be perfect independently of the depression of the axle C. When one of the wheels W strikes against an obstacle, the shock will not cause the wheels $i$ and $h$ to come out of gear, as the distance between the axles $b$ and C is invariable. The carriage-body D will be but slightly or not at all subjected to shocks, these being deadened by the springs $e$ and the elastic arms $g^2$. Finally the vibrations of the motor will not be transmitted to the carriage on account of the elastic suspension of the engine by means of the elastic arms $m$ and the stays $l$. The latter will also counteract in a measure the pressure exerted by the driving belts, and thus contribute to steady the motion of the engine. The distance between the main-shaft $a$ of the motor and the axle C of the driving gear remains approximately constant notwithstanding the vibrations of the engine, or the shocks to which the wheels are subjected.

What I claim, and desire to secure by Letters Patent of the United States, is—

1. In a vehicle, the combination with the body thereof, of an axle $b$, wheels W carried by said axle, elastic arms $g^2$ secured at the forward end to the said body and provided with the vertically-broadened rigid arms $g'$, the rear ends of said arms $g'$ being secured to the axle $b$, and a driving gear supported by said arms $g'$, as and for the purpose specified.

2. A vehicle, the driving-gear of which is supported by rigid arms $g'$ secured to the axle $b$ of the carriage-wheels W, and the body D of which is supported by means of springs $e$ resting on the axle $b$ and of elastic arms $g^2$ secured to hangers $k$ and forming the continuation of the rigid arms $g'$, for the purpose set forth.

3. In a vehicle, a driving gear supported by rigid arms $g'$ secured to the axle $b$ of the carriage-wheels, a body D supported by springs $c$ resting on axle $b$ and by elastic arms $g^2$, and a motor A, secured in relation to the body D by means of elastic arms $m$ and stays $l$, all constructed substantially as described, for the purpose specified.

In testimony whereof I have signed this specification in the presence of two subscribing witnesses.

WILHELM MAYBACH.

Witnesses:
ERNST MOCIVES,
CARL LINCK.